United States Patent
Shchurovskiy et al.

(10) Patent No.: US 10,513,186 B1
(45) Date of Patent: Dec. 24, 2019

(54) IN-WHEEL ELECTRIC MOTOR WITH AN INCREASED ELECTROMAGNETIC FLUX AND ENERGY RECOVERY BRAKE

(71) Applicants: Denis Vasilyevich Shchurovskiy, Uzyukovo (RU); Waldemar Olegovich Wagner, Podstyopki (RU)

(72) Inventors: Denis Vasilyevich Shchurovskiy, Uzyukovo (RU); Waldemar Olegovich Wagner, Podstyopki (RU)

( * ) Notice: Subject to any disclaimer, the term of this patent is extended or adjusted under 35 U.S.C. 154(b) by 0 days.

(21) Appl. No.: 15/800,814

(22) Filed: Nov. 1, 2017

(51) Int. Cl.
| | | |
|---|---|---|
| B60K 7/00 | (2006.01) | |
| B60L 7/26 | (2006.01) | |
| B60T 7/04 | (2006.01) | |
| B60T 13/66 | (2006.01) | |
| B60L 7/14 | (2006.01) | |
| B60L 15/20 | (2006.01) | |

(52) U.S. Cl.
CPC .............. *B60L 7/26* (2013.01); *B60K 7/0007* (2013.01); *B60L 7/14* (2013.01); *B60L 15/2009* (2013.01); *B60T 7/042* (2013.01); *B60T 13/667* (2013.01); *B60K 2007/0092* (2013.01); *B60L 2220/12* (2013.01); *B60L 2220/44* (2013.01); *B60L 2220/50* (2013.01); *B60T 2220/04* (2013.01); *B60T 2270/604* (2013.01)

(58) Field of Classification Search
CPC ....... B60K 7/0007; B60K 7/0015; B60L 7/26; B60T 13/667
See application file for complete search history.

(56) References Cited

U.S. PATENT DOCUMENTS

| | | | |
|---|---|---|---|
| 2,506,146 A | 5/1950 | Gladish | |
| 3,584,276 A | 6/1971 | Ringland | |
| 3,621,929 A | 11/1971 | Oberthur | |
| 4,962,969 A | 10/1990 | Davis | |
| 5,327,034 A * | 7/1994 | Couture | B60K 7/0007 310/64 |
| 5,442,250 A | 8/1995 | Stridsberg | |
| 5,573,312 A | 11/1996 | Muller et al. | |
| 8,316,973 B2 * | 11/2012 | Walter | B60K 7/0007 180/65.51 |
| 2008/0078631 A1 | 4/2008 | Erlston et al. | |
| 2014/0015382 A1 * | 1/2014 | Kim | H02K 7/14 310/67 R |
| 2017/0028835 A1 | 2/2017 | Worley | |

* cited by examiner

*Primary Examiner* — Brian L Swenson

(57) ABSTRACT

The in-wheel electric motor system with an increased electromagnetic flux and energy recovery brake provides electromagnetic flux with optimal characteristics of starting torque and peak power in all modes of motor operating. It becomes possible because the stator of the electric motor consists of windings with a "star" connection and windings with a "wye" connection in such a way that electromagnetic fields of these windings are summed and the number of phases of the motor is more than a standard motor that has one type of winding.

1 Claim, 2 Drawing Sheets

IN-WHEEL ELECTRIC MOTOR WITH AN INCREASED ELECTROMAGNETIC FLUX AND ENERGY RECOVERY BRAKE

FIELD OF THE INVENTION

The present invention relates generally to electric transport, and in particular to assemblies that include an electric motor incorporated into a wheel and having a function of energy recovery during braking. The assembly of the present invention could be used for electric powered vehicles (e.g., cars), scooters, trains, bicycles and/or the like.

BACKGROUND OF THE INVENTION

U.S. Pat. No. 5,327,034, issued Jul. 5, 1994, discloses an electrically motorized wheel comprising a fixed shaft, having wheel on it, and a rotor in the form of an electric winding, which is located outside the stator on the wheel. The stator is coaxial with the rotor and is located on the fixed part of the structure with an inner side of the rotor.

The patent does not show a connection with the hydraulic braking system. Traditionally, passenger vehicles use a hydraulic braking system. A hydraulic braking system is reliable and safe. Electric vehicles should use it too, at least as a reserve system. There is a need for an additional conventional braking system for reliability and for braking during such driving modes, which expect that braking from recovery becomes inefficient.

U.S. Pat. No. 3,621,929, issued Sep. 24, 1969, discloses a brake system for electrically operated vehicles comprising a main cylinder, a hydraulic line connected to the main cylinder and a main cylinder actuation pedal, a battery, an electric motor capable of converting the battery's energy into kinetic energy of rotation of the vehicle's drive axis, a control means associated with the accelerator pedal and the power supply line to the motor, the position of the accelerator pedal and, if necessary, the activation of the electric current supply to the electric motor, and activation of generator mode of the electric motor during braking with ability of transformation of kinetic energy of motion into electrical energy and storing it in a battery, monitoring the braking torque means adapted to ensure engagement of the hydraulic system only when the braking torque has certain value.

This system provides an interrelation between the operation of the hydraulic braking system and the braking system by the electric generator with the transformation of the kinetic energy of the vehicle to electrical energy, preventing the activation of the hydraulic braking system in cases where braking with recuperation is possible. This allows saving the electric energy used for driving the vehicle and mechanical part of the hydraulic braking system.

However, the above mentioned system has a drawback associated with the peculiarity of connecting the phases of an induction AC motor. The preferred mode of power supply for starting the electric motor at the beginning of the vehicle's movement is characterized with the "star" connection of the windings, because the required starting torque is provided with a lower current load. For development of the maximum power during acceleration it is need to change windings to the "wye" connection. When the motor is connected to only one of the above circuits, the motor will either not be able to reach maximum power when windings have a "star" connection, or it will be overloaded with starting currents, and windings can burn out when the vehicle starts to move, when connected with a "triangle."

Switching from one circuit to another occurs instantly, not smoothly. It is like a gear shift in a manual gearbox. Therefore, not in all ranges of torque will be ensured the optimum feeding of the motor coils, which is the first drawback. The second drawback of such a switching from one circuit to another during driving is the a shock load causing damage of the mechanisms, as well as an excessive electrical load on the windings of the motor causing damage of the wires.

Many other systems associated with in-wheel electric motors with brakes have been disclosed. See, for example, U.S. Pat. Publication Nos. 2008/0078631, 2014/0015382 and 2017/028835, as well as U.S. Pat. Nos. 2,506,146, 3,584,276, 4,962,969, 5,442,250 and 5,573,312. None of them are germane to the present invention.

SUMMARY OF THE INVENTION

This invention provides electromagnetic flux with optimal characteristics of starting torque and peak power in all modes of motor operation.

According to the general teachings of the present invention, there is provided an in-wheel electric motor system with an increased electromagnetic flux and energy recovery brake, comprising:
  an asynchronous electric motor built in a wheel;
  a hydraulic braking system;
  wherein the electric motor consists of a stator windings fixed on a wheel axis and a squirrel-cage rotor on a rotating part of the wheel;
  an electric motor power supply line with a commutator;
  wherein the hydraulic braking system consists of a master brake cylinder and a hydraulic line connecting the master brake cylinder with an executive brake cylinder of hydraulic brake of the wheel;
  a control unit associated with an accelerator pedal, a brake pedal, the master brake cylinder and the electrical commutator with providing the commutation of the electric motor to a source of electrical power and switching of the electric motor into generation mode, in which the electric motor operates as a generator braking the vehicle with the conversion of kinetic energy of the vehicle's movement into electrical energy and with engagement of the hydraulic braking system only when braking torque has a certain value;
  wherein the stator of the electric motor consists of windings with a "star" connection and windings with a "wye" connection in such a way that any and/or all electromagnetic fields of these windings are summed and a number of phases of the motor is more than a standard motor that has one type of winding.

DETAILED DESCRIPTION OF THE INVENTION

Figure 1:
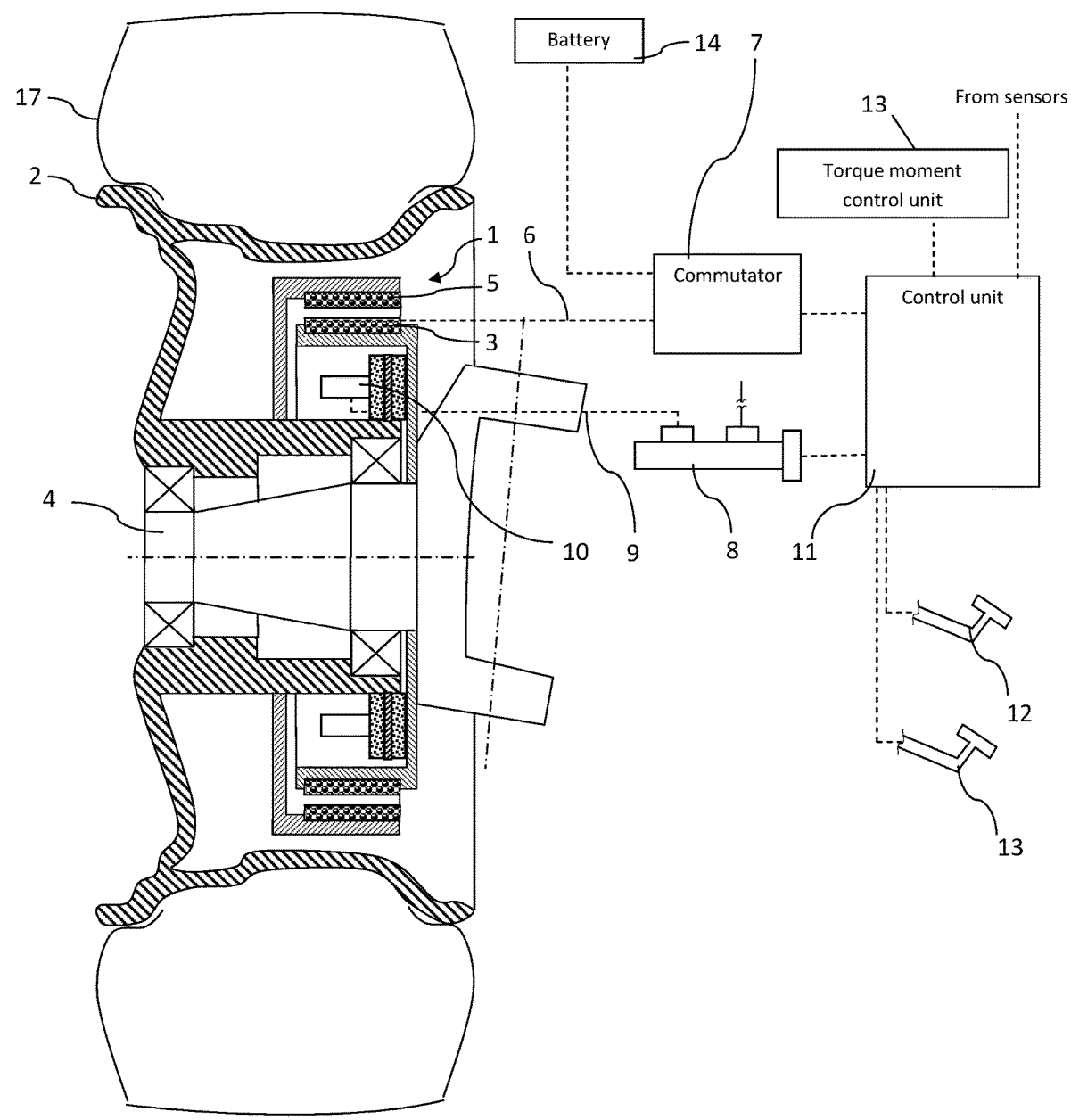
FIG. 1 is a schematic view of an illustrative in-wheel electric motor system with an increased electromagnetic flux and energy recovery brake, in accordance with the general teachings of the present invention.
Figure 2:
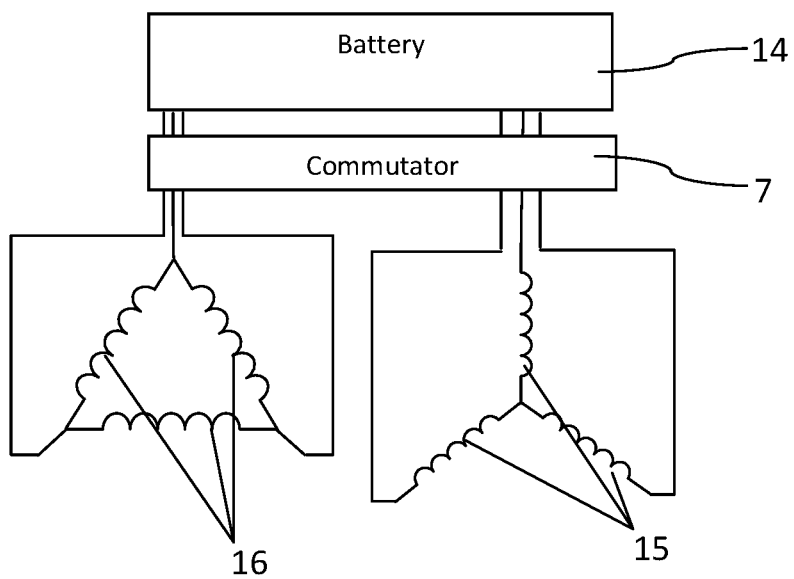
FIG. 2 is an electrical schematic view of an illustrative winding connection, in accordance with the general teachings of the present invention.

Referring to the Figures generally, the in-wheel electric motor system with an increased electromagnetic flux and energy recovery brake comprises an asynchronous electric motor 1 built in a wheel 2. The electric motor 1 consists of stator windings 3 fixed on a fixed axis 4 and a squirrel-cage rotor 5 on a rotating part of the wheel 2. There is an electric motor power supply line 6 with a commutator 7. There is a hydraulic braking system consisting of a master brake cylinder 8 and a hydraulic line 9 connecting the master brake cylinder 8 with an executive brake cylinder 10 of the hydraulic brake of the wheel 2. There is a control unit 11 associated with an accelerator pedal 12, a brake pedal 13, the master brake cylinder 8 and the electrical commutator 7 for providing commutation of the electric motor 1 to a source of electrical power 14 and switching of the electric motor 1 into a generation mode, in which the electric motor 1 operates as a generator braking the vehicle with the conversion of kinetic energy of the vehicle's movement into electrical energy and with engagement of the hydraulic braking system only when braking torque has a certain value. The stator windings 3 of the electric motor 1 consist of windings 15 with a "star" connection and windings 16 with a "wye" connection in such a way that any and/or all of the electromagnetic fields of these windings are summed.

In accordance with one embodiment of present invention, the wheel 2 may be structurally similar to a standard 14-inch wheel with a pneumatic tire 17. It is designed for use as one of the four wheels of a vehicle. Its only difference from the standard wheel is the electric motor 1. The electric motor 1 may be an asynchronous electric motor with a three-phase alternating current supply. Its construction may be close to a typical analog.

In accordance with one of the embodiments of the present invention, the stator 3 of the electric motor 1 may be made in the form of a copper wire wound on a steel magnetic core. It may be formed by for example ninety-six such windings located along the circumference of the wheel. The difference from a typical analogue is that odd windings 15 have "star" connections, even windings 16 have "wye" connections. Thus, it may be a sixteen pole asynchronous electric motor with combined windings. However, the ratio of "star" and "wye" windings, as well as their winding parameters could be different, e.g., it depends on the purposes of application and may be calculated for the specific purposes of using the electric motor.

Rotor 5, in accordance with one of the embodiments of the present invention, may be made in the form of squirrel-cage. The source of power supply 14 may be a lithium-ion battery. The brake cylinder 10, the master brake cylinder 8 and the hydraulic line 9 are typical used in passenger vehicles, except that the master brake cylinder 8 may be controlled from the control unit 11. The control unit 11 may be in the form of an electronic unit based on a microcontroller. It consists structurally of two units. A tracking unit which tracks the signals of the wheel speed sensors, the accelerator 12 and brake 13 pedals position sensors. The control unit 11 gives control signals to the actuators—the master brake cylinder 8 and the commutator 7. Signals are based on the algorithm putted in the control unit and signals received from sensors.

Consider an example of operation of the in-wheel electric motor system with an increased electromagnetic flux and energy recovery brake. In an initial condition, the vehicle does not move. However, when the accelerator pedal 12 is pressed, the control unit 11 gives a signal to the commutator 7 for commutating the electric motor 1 to the battery 14. As a result, the vehicle starts to accelerate. When the electric motor 2 is running, the windings 15, which has the "star" connection, and the windings 16, which has the "wye" connection, work simultaneously.

During acceleration, electrical moment may be distributed through both combined windings, e.g., "star" connection 15 and "wye" connection 16. Current distribution goes also through combined windings simultaneously. However, distribution may not be symmetric to "star" connection 15 and "wye" connection 16, but managed by control unit 11. It allows increasing capability of motor overload and efficiency from 3 to 40%, significantly decreasing motor noise level up to 40% due to exclusion of overflow of eddy current and symmetric distribution of motor electric load.

With the vehicle gaining speed, the load may be continuously transferred to the windings connected by the "wye" circuit 16 and the electric motor 1 goes to the maximum power mode. However, combined windings have higher capability for peak current overload and overall nominal and maximum power of such a motor may be greater than a standard motor due to the increased number of phases of the motor that may be more than a standard motor that has one type of winding. The summed electromagnetic fields of the combined windings provide greater torque of the motor than any standard motor has.

After the brake pedal 13 is pressed, information of the level of pressing goes to the control unit 11. Based on the data on the wheel speed 1 and the level of depression of the brake pedal 13, the control unit 11 calculates the braking torque that must be created in the current situation to provide the vehicle's braking. If the obtained braking torque is less than the value specified in the control program of control unit 11, the control unit 11 gives a signal for changing the commutation of the electric motor 1 to the generator mode without using the hydraulic brake system. If the braking torque is bigger than the value specified in the control unit's 11 algorithm then additionally actuated the master brake cylinder 8, which actuates the executive brake cylinder 10. The result is that the braking may be effected both by the hydraulic brake system and the motor 1.

The efficiency of the motor-wheel drive system with increased magnetic flux and the braking function with energy recovery has been confirmed by the experimental operation of the device described in the example of the specific implementation. Experienced operation of the device showed that the proposed device has a high energy efficiency, which distinguishes the device from existing analogues. This confirms the achievement of the technical result of the invention.

Efficiency of operating of the in-wheel electric motor system with an increased electromagnetic flux and energy recovery brake is confirmed by the exploitation of the device. The device has high energy efficiency which distinguishes it from the analogs.

What is claimed is:
1. An in-wheel electric motor system with an increased electromagnetic flux and energy recovery brake, comprising:
   an asynchronous electric motor built in a wheel;
   a hydraulic braking system;
   wherein the electric motor includes stator windings fixed on a wheel axis and a squirrel-cage rotor on a rotating part of the wheel;
   an electric motor power supply line with a commutator;
   wherein the hydraulic braking system includes a master brake cylinder and a hydraulic line connecting the master brake cylinder with an executive brake cylinder of a hydraulic brake of the wheel;

a control unit associated with an accelerator pedal, a brake pedal, the master brake cylinder and the commutator for providing commutation of the electric motor to a source of electrical power and switching of the electric motor into a generation mode, in which the electric motor operates as a generator braking a vehicle with a conversion of kinetic energy of the vehicle's movement into electrical energy and with engagement of the hydraulic braking system only when braking torque has a certain value;

wherein the windings of the stator include star connections and wye connections in such a manner that any electromagnetic fields of these windings are summed and a number of phases of the motor is one or more.

\* \* \* \* \*